July 25, 1967  KIYOSHI INOUE  3,333,081
DISCHARGE-MACHINING APPARATUS
Filed March 4, 1964  5 Sheets-Sheet 1

INVENTOR
KIYOSHI INOUE

July 25, 1967  KIYOSHI INOUE  3,333,081
DISCHARGE-MACHINING APPARATUS
Filed March 4, 1964  5 Sheets-Sheet 4

*INVENTOR*
*KIYOSHI INOUE*

United States Patent Office 3,333,081
Patented July 25, 1967

3,333,081
DISCHARGE-MACHINING APPARATUS
Kiyoshi Inoue, 182 3-chome, Tamagawagoga-machi,
Setagaya-ku, Tokyo, Japan
Filed Mar. 4, 1964, Ser. No. 349,458
2 Claims. (Cl. 219—69)

ABSTRACT OF THE DISCLOSURE

An electrical discharge-machining power supply having two generators of one-polarity impulses connected to the spark gap. Each impulse has a duration of less than half that of each cycle of operation. Switching means are provided to reverse the polarity, and/or to shift the phase relationship, of the impulses, whereby, by superimposition or by phase separation, impulses can be applied across the gap ranging from relatively high gap-ionizing amplitude and low frequency to relatively low gap-ionizing amplitude and high frequency.

---

This invention relates to improvements in spark-discharge-machining apparatus and more particularly concerns improvements in power-supply and voltage-control arrangement in such apparatus. This application is a continuation-in-part of my application Ser. No. 61,543, filed Oct. 10, 1960, now abandoned.

Reference is made to my U.S. Patent No. 3,098,164, issued July 16, 1963 for a detailed disclosure of dynamo-electric impulse generators as an example of generators with which the present invention may be employed.

In that patent there are disclosed certain dynamo-electric impulse generators which comprise power-supply devices highly suitable for spark-discharge-machining apparatus of large capacity and high machining speed. In the application of dynamo-electric impulse generators to spark-discharge machining, rapid machining is achieved by reason of the large current and voltage capacity of the impulse generators, providing sufficient intervals between successive impulses for completing the deionization of the spark gap after each machining impulse. In this manner it is possible to remove metal at a rapid rate without danger of arcing which would be destructive of the electrode and the work piece. However, at these rapid metal removal rates achieved by the high-amplitude impulses with relatively long recovery intervals between impulses, the work surface becomes roughened by the ridges and craters produced by the spark discharges and it is necessary to provide a separate and additional machining operation in order to produce a finished, smooth surface. Such smooth surface can also be produced, on the other hand, by lower-amplitude impulses which, in order to realize maximum machining speed, should occur at closer intervals than the minimum permissive intervals in the case of high-amplitude-impulse machining. Shorter intervals between pulses are permissible in the case of low amplitude impulses because the recovery time of the gap is correspondingly shorter. It therefore becomes desirable to provide power supply apparatus capable of rough machining at very high speeds and of finish or smooth machining at speeds no higher than the maximum consistent with the requirements of finish machining.

An object of the present invention, therefore, is to provide in spark-dicharge-machining apparatus novel power-supply arrangements utilizing dynamo-electric spark-discharge generators in an effective and efficient manner for performing both phases of machining.

Another object hereof is to provide a new and improved circuit arrangement for combining the outputs of separate impulse generators in order to satisfy alternatively the requirements for rough machining and for finish machining.

A further object is to provide apparatus which permits changing the ratio between pulse duration and pulse interval in spark-discharge-machining apparatus utilizing one or more dynamoelectric or other suitable spark-discharge-impulse generators. In this manner relatively high-amplitude current impulses with relatively long duration between impulses are available for rough machining and lower-amplitude impulses with relatively shorter pulse interval can be produced for finish machining, both operations being performed at maximum speed consistent with machining requirements.

A more specific object of the invention is to achieve the foregoing results with the aid of a plurality of dynamo-electric impulse generators which may be operated at substantially constant speed and in a synchronous manner, by means of a common prime mover, in any efficient region of their operating characteristics during both coarse machining and finish machining.

Still another object of this invention is to provide a versatile and efficient, practicable spark-discharge-machining apparatus utilizing rotary dynamo-electric impulse generators or equivalent devices in such manner that different machining operations may be performed with the same basic impulse generator assembly without changes in the structural forms of the individual impulse generators or of their internal winding connections.

According to one aspect of my invention, the output of a plurality of impulse generators are combined in an adjustable manner to produce a train of output impulses which, depending on whether the component impulse trains of like or related frequency from the several generators are cophasal or interleaved, will be either of large amplitude and low frequency or of small amplitude and high frequency. The term "pulse" or "impulse," as used in this context, applies to both voltage and current since the current available at the spark gap during discharge will depend on the voltage delivered by the source. In order that the pulse trains may be properly interleaved for high-frequency operation, it is necessary that the width of each pulse will be less than $t/N$ where $t$ is the repetition period or cycle length and N is the number of generators; in a two-generator system, for example, the pulse width should be less than half a period. Although in many cases it will be simplest to make the repetition frequency of all impulse generators identical, there are instances in which the desired result may be achieved if one generator operates at a frequency equal to an aliquot part or integral multiple of that of another generator so that, generally, one operating frequency should equal an integral number of times (including unity) any other operating frequency.

According to another aspect of this invention, failure of the usual servo control to maintain a constant gap length between the machining electrode and the workpiece is compensated by a coresponding variation in both the recurrence rate and the intensity of the applied current pulses, the impulse frequency being changed generally inversely with gap length whereas the impulse intensity is altered generally in proportion thereto. This may be accomplished, again, with the use of two impulse generators of like output frequency and variable relative phase, advantageously with the aid of a coupling (such as a magnetic clutch) operable to advance or retard one of the generators with reference to the other. It is, however, also possible to achieve this result by means of a single generator of adjustable frequency and pulse amplitude.

These and other objects, features and advantages of my invention will become more fully evident from the following description of several illustrative embodiments, given with reference to the accompanying drawing in which.

Figure 1:
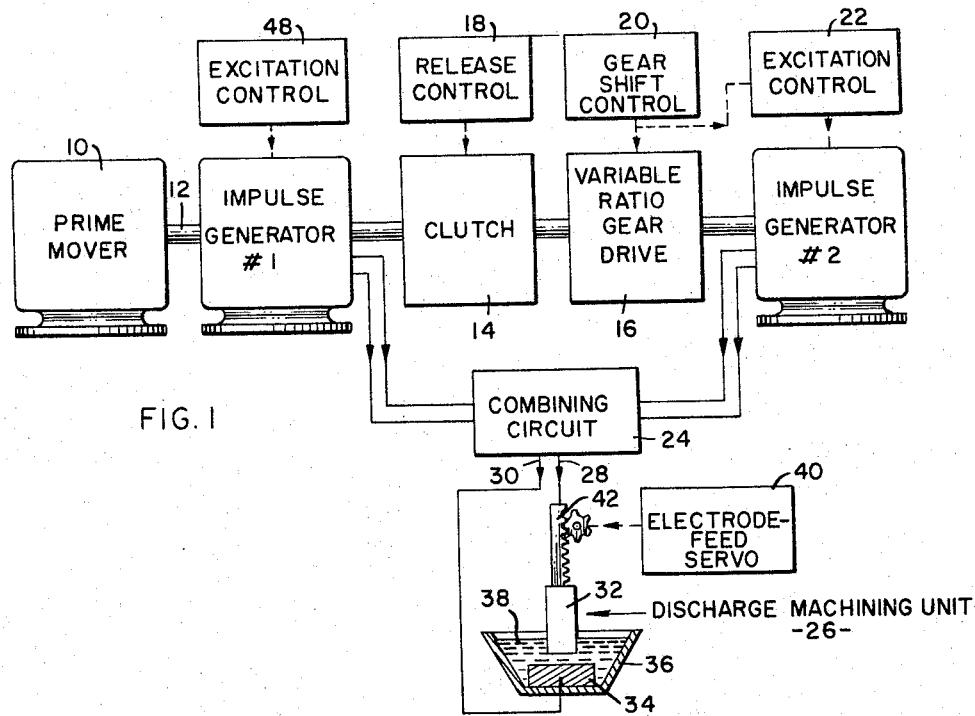
FIG. 1 is a block diagram illustrating spark-discharge apparatus embodying the invention.
Figure 2:
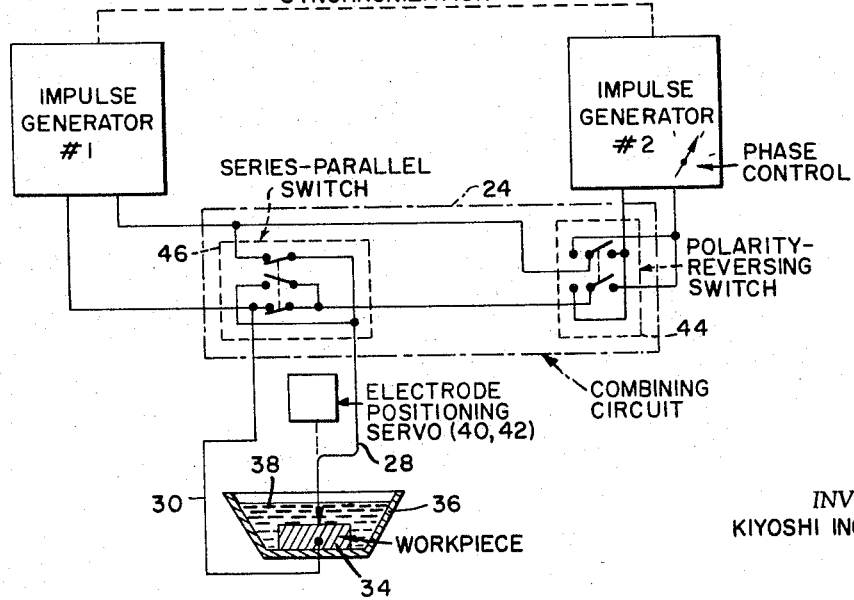
FIG. 2 is a partially schematic block diagram illustrating the combining circuit arrangements for two impulse generators co-operating in the apparatus.
Figure 3:
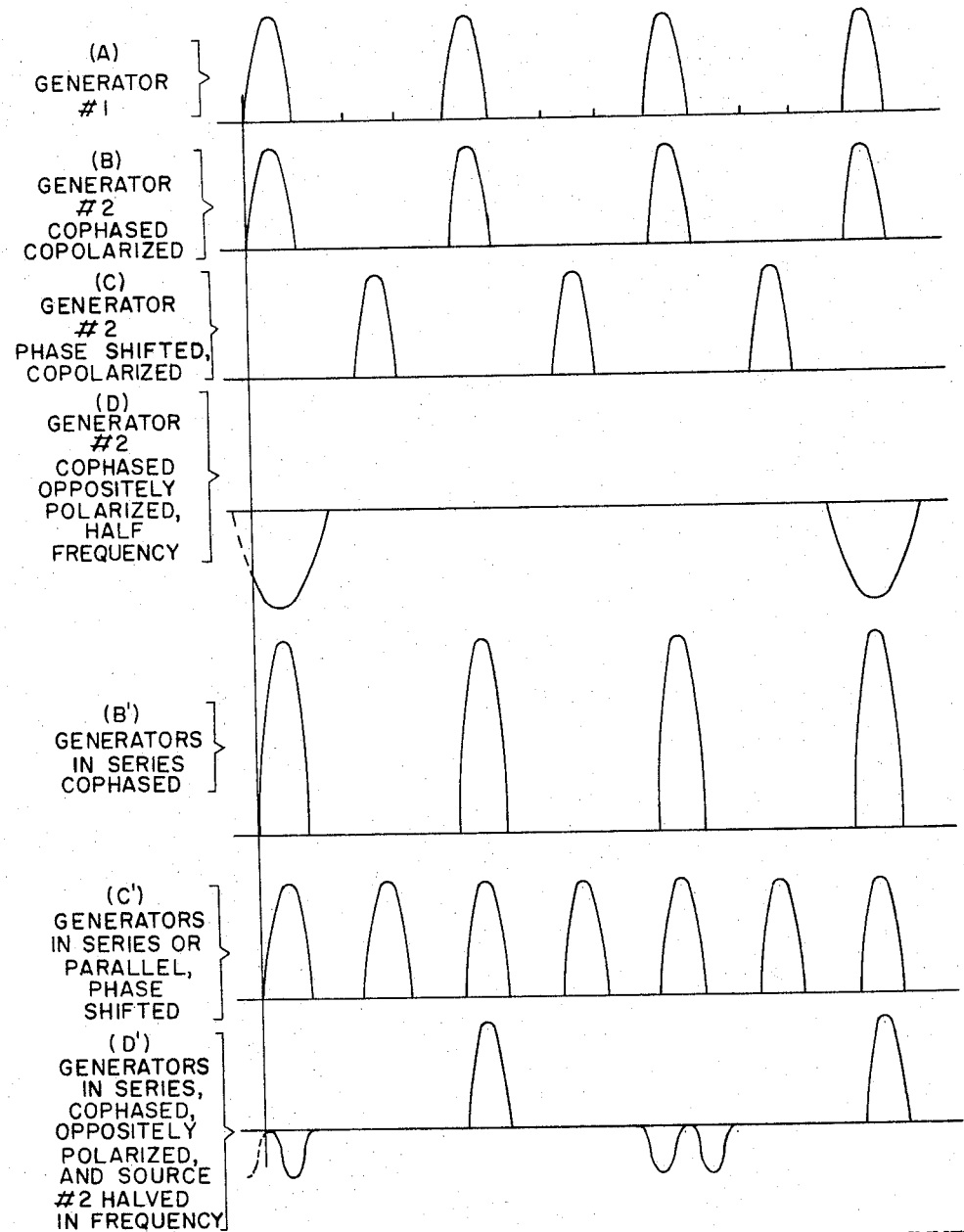
Figure 4:
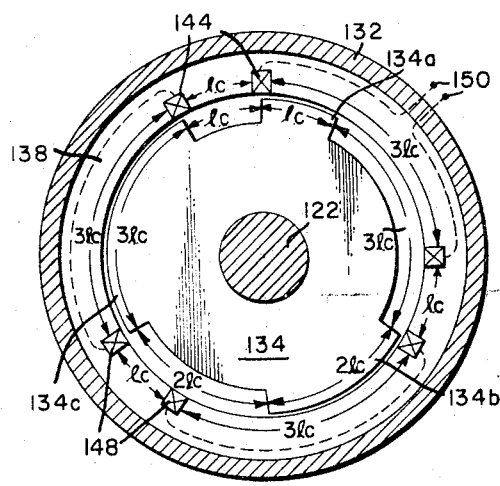
Figure 5:
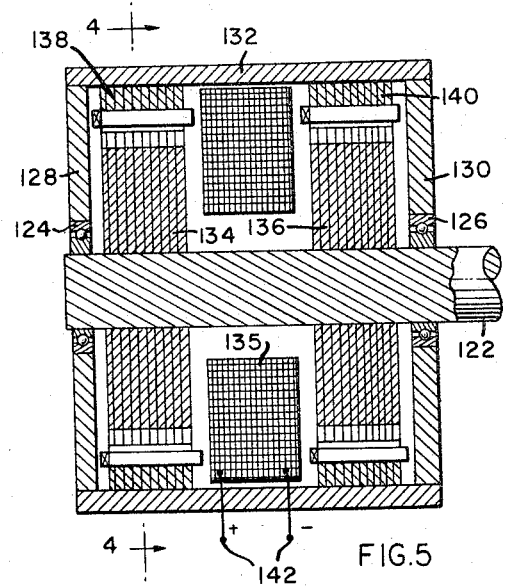
Figure 6:
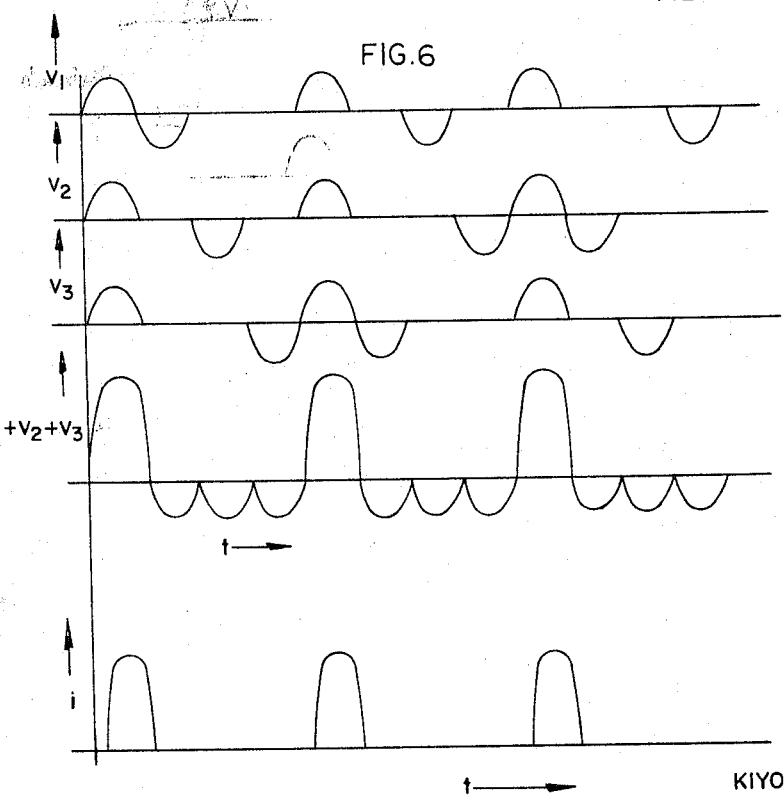
Figure 7:
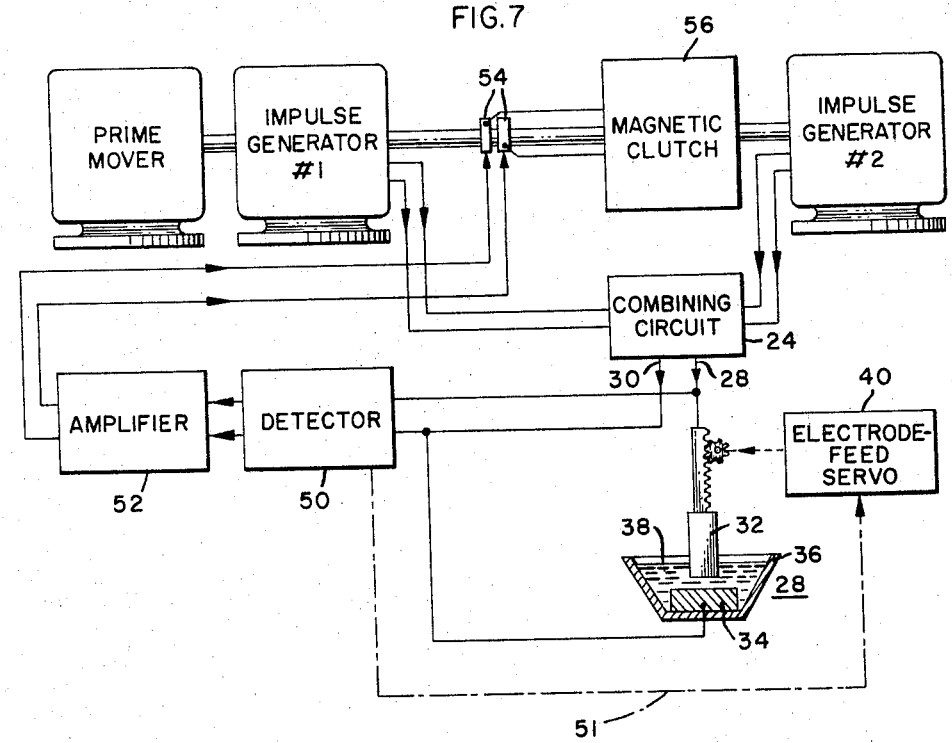
Figure 8:
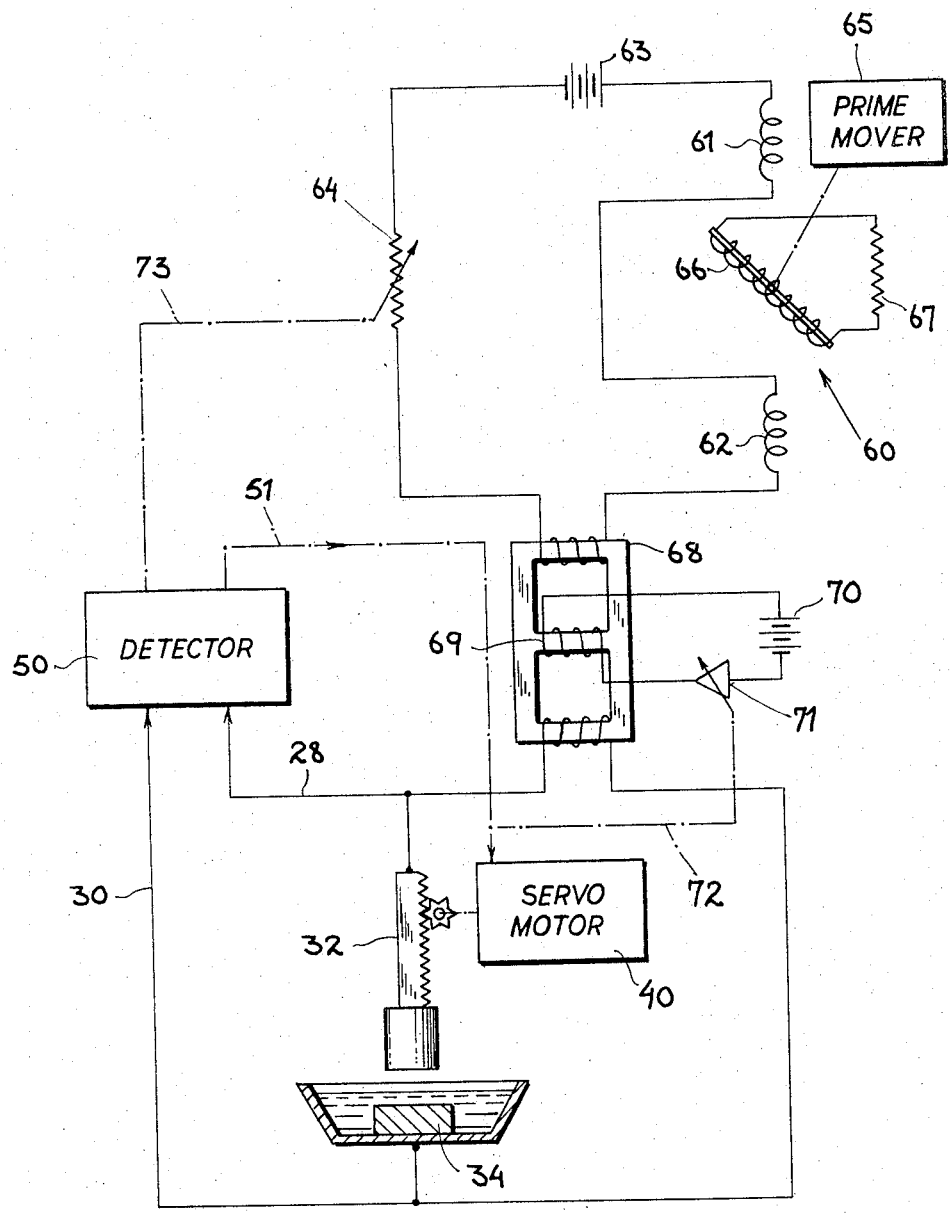

FIG. 3 comprises a series of wave diagrams illustrating different modes of operating the apparatus shown in FIGS. 1 and 2;

FIGS. 4, 5 and 6 correspond, respectively, to FIGS. 3, 4 and 6 of my Patent No. 3,098,164, illustrating one suitable type of rotary impulse generator and the wave diagrams associated therewith;

FIG. 7 is a block diagram illustrating operation of the invention in an automatic-voltage-control power-supply system for spark-discharge-machining apparatus; and FIG. 8 shows a circuit arrangement for a further system according to the invention.

It is assumed in the system of FIG. 1, for example, that the rotary impulse generators 1 and 2 diagrammatically illustrated therein are of identical or similar construction, although they may differ if desired. Generator 1 is connected directly to a prime mover 10 through a shaft 12 whereas generator 2 is connected to the prime mover through extensions of this shaft between which are interposed a clutch 14 and a variable-ratio gear drive 16 or other means for changing the speed of impulse generator 2 in relation to that of generator 1. However, in some applications speed change is not essential although in all cases it is necessary to provide means between the two generators for shifting the phase of the current impulses in the output of one generator relative to those produced by the other. In this instance, the clutch 14 is operated by a release-control device 18 capable of permitting relative rotation or slip to occur between the two generators so as to shift the relative phase thereof to a desired degree. The gear drive 16 has associated with it a gear-shift control 20 which in this embodiment is also connected to operate the excitation-control unit 22 by which the field windings of generator 2 are energized. The excitation control permits the speed of generator 2 to be reduced to half its original value, for example, with maintenance of the same output-pulse magnitude, this being accomplished by doubling the excitation of the field windings.

In addition the apparatus comprises a combining circuit 24, to be described more fully hereinafter, by which the outputs of the two generators are suitably combined for application to a discharge-machining unit 26 through connecting leads 28 and 30. The unit 26 comprises an electrode 32, a workpiece 34 to be machined, a supporting tank 36 in which the workpiece and electrode are immersed in a machining fluid 38, and means including a servo motor 40 and a rack-and-pinion unit 42, or other suitable device for feeding the electrode 32 progressively in relation to the workpiece 34 so as to maintain a substantially constant spark-discharge gap therebetween. A suitable control for such servo motor will be described hereinafter in connection with FIGS. 7 and 8.

It will be recognized that in the generalized illustration of FIG. 1 the two generators 1 and 2 may be paralleled or series-connected. Also, they may be operated in phase coincidence or in phase-displaced relationship, or may alternate between these two modes of operation. The speed of impulse generator 2 may be equal to that of generator 1 or may be an integral multiple or submultiple thereof, through operation of the variable-ratio gear drive or equivalent coupling means.

FIGS. 2 and 3 illustrate more fully certain of the possibilities referred to above. In FIG. 2 the combining circuit 24 is shown as comprising a polarity-reversing switch unit 44 operable to connect the impulse generator 2 across the leads 28 and 30 with the same polarity as impulse generator 1 or with relatively opposite polarity. A series-parallel switch unit 46 also interposed in the electric circuit leads between the two generators is operable to connect these generators in series relationship with the leads 28 and 30 or in parallel relationship across such leads.

In FIGS. 3A and 3B the output impulses of generators 1 and 2 are depicted in co-phased, co-polarized releationship and of substantially equal amplitudes; the pulses from each generator have a width less than one-half of the operating period. In FIG. 3C the clutch 14 has been released momentarily to permit generator 2 to drop back slightly in phase relative to generator 1 so that the current impulses from generator 2 are interleaved with those from generator 1 in point of time. FIG. 3D illustrates the current impulses from generator 2 with the reversing switch 44 actuated to the opposite position so as to reverse the polarity of this generator and with the gear drive 16 shifted to a position which halves the frequency of generator 2. It will be noted that the reduction of generator speed causes not only doubling of the pulse interval but also increase of the pulse width. While this is not an object of speed reduction, it has no adverse effect as will be made clear.

FIG. 3B′ depicts the resultant current impulses applied to the discharge machining unit 26 when the impulses of FIG. 3B are added to those of FIG. 3A by the combining circuit 24, with the two generators series-connected. Here the pulse interval remains the same but the pulse amplitude has been doubled, this case representing the operating mode for rough machining at maximum speed. In the mode depicted in FIG. 3C′ the generators have been connected either in series or in parallel and the impulses of generator 2 have been added to those of generator 1 with the former displaced in phase as in FIG. 3C. This is the mode for fine-machining operation.

FIG. 3D′ illustrates the resultant output from the combining circuit when the impulses of FIG. 3D are added serially to those of FIG. 3A, under the conditions previously mentioned. Now the discharge-machining impulses applied to the unit 26 occur at half the frequency of those in FIG. 3B′ and at half the amplitude. Under these circumstances the excitation of impulse generator 1 may be increased considerably, if desired, in order to obtain maximum rough-machining speed, which is made possible by the fact that the recovery time (i.e. the pulse interval) is doubled. For this purpose an excitation control 48 is provided in connection with generator 1. If the switch 44 is moved to a center position so that it makes no contact with the terminals of generator 2, and if concurrently the switch 46 is shifted to parallel connection, only impulses from generator 1 can be applied to the gap so as to effect fine machining at double the rough-machining frequency. For such fine machining, however, the excitation control 48 (FIG. 1) should be readjusted to its original lower amplitude value.

The impulse generator illustrated in FIGS. 4 and 5, whose construction is claimed in my aforementioned Patent No. 3,098,164, is operable to produce impulses which have approximately a one-fourth duty cycle (i.e. whose duration is approximately one-third the interval between successive current impulses). This device comprises a ferromagnetic shaft 122 rotatively supported in bearings 124 and 126 mounted centrally within non-magnetic end plates 128 and 130, respectively. These end plates are interconnected by a cylindrical ferromagnetic shell 132 forming part of the field structure of the stator. An annular exciter coil 135 is mounted within the housing or shell 132 at a location generally intermediate the end plates 128 and 130. Mounted on the shaft 122 between the coil 135 and the end plate 128 is a first ferromagnetic rotor structure 134. A similar rotor structure 136 is mounted on the shaft between the end plate 130 and the coil 135. The stator core is formed in two parts, one a laminated annular ferromagnetic structure 138 which surrounds the rotor structure 134, the other a similar ring structure 140 which surrounds the rotor structure 136, the two ferromagnetic stator-core assemblies 138 and 140 being mounted directly in contact with and within the ferromagnetic shell 132. Thus, a magnetic-flux path is formed which includes the shaft 122, arranged serially with the rotor structure 134, the ring structure 138, the cover 132, the ring structure 140 and the rotor structure 136. The coil 135 is energized by direct current applied through terminals 142, and the shaft 122 is rotated by a suitable motor (not shown) operated at a constant speed which produces the desired pulse width and spacing as explained below.

In FIG. 4 the stator core 138 is shown to have three sets of slots equispaced around its periphery. These slots contain stator coils 144, 146 and 148, respectively. Each coil occupies a given portion of the periphery, designated $l_c$, whereas the spacing between adjacent coils is equal to three times $l_c$. The co-operating rotor core structure 134 has salient portions 134a, 134b and 134c. The portion 134a has a peripheral length equal to that of the coils, namely $l_c$. The portion 134b has twice the peripheral length of the portion 134a or $2l_c$, whereas the portion 134c has a peripheral length equal to three times that of the portion 134a, i.e. $3l_c$. The peripheral spacing between adjacent edges of the portions 134a and 134b is equal to three times the peripheral length of the salient portion 134a, whereas the peripheral spacing between the portions 134b and 134c is equal to twice that distance; likewise the peripheral spacing between the portions 134c and 134a is equal to $l_c$. The coils 144, 146 and 148 are connected in series, as indicated by the dotted lines in FIG. 4, and tied to output terminals 150 which are to be connected to the workpiece and the electrode, respectively, in the electric-discharge-machining apparatus of the preceding figures.

In FIG. 6 the successive wave forms $v_1$, $v_2$ and $v_3$ represent the induced voltages in the respective coils 155, 146 and 148, the combined wave form $v_1+v_2+v_3$ representing the summation of these individual wave forms and therefore the output voltage as it appears at the terminals 150. As the salient pole 134a commences to enter the induction-field region of the coil 144 (i.e. to pass under the coil as shown), with the rotor structure 134 moving in the direction of the arrow, there will thereafter be a progressive increase in the magnetic flux linking the coil 144, giving rise to the position portion of the first wave in the graph $v_1$ in FIG. 6. As the salient pole 134a commences to leave the field region of coil 144, there will be a corresponding decrease of flux linking the coil and a resulting negative voltage impulse will be induced in the coil, thereby completing a full cycle of a wave of substantially sinusoidal form. Subsequently, as the salient pole 134b enters the field of coil 144 there will be a similar positive impulse but, because the salient pole 134b is twice the length of the pole 134a, there will be an interval between the termination of the positive impulse and the commencement of the ensuing negative impulse. Owing to the geometry of the structures as illustrated, this interval will be as wide as the individual impulse. Thereafter, the approach of the salient pole 134c to the coil 144 produces a succeeding positive impulse and an ensuing negative impulse separated from the positive impulse by three times the length of the impulses themselves, since the salient pole 134c is equal to three times the length of the salient pole 134a. In like manner the wave forms $v_2$ and $v_3$ induced in the other coils 146 and 148 may be analyzed and depicted as in FIG. 6. When these impulses are all added together by reason of the series interconnection of the coils, a resulting wave form is produced consisting of positive voltage and current impulses which have three times the amplitude of the individual impulses and which are separated by intervals three times the pulse width. Low-amplitude negative impulses occur during these intervals but have only one-third the amplitude of the positive impulses. By coil and field-structure design these negative impulses are made less than the value of voltage $e_1$ required for spark discharge in the gap.

In FIG. 7 the two impulse generators are connected to the combining circuit 24 so as to be operated synchronously and at the same speeds and with their output windings in series, producing normally the wave form depicted in FIG. 3C. However, the voltage occurring across leads 28 and 30 and transmitted to the machining unit 26 is applied also to a detector 50 whose suitably integrated output is delivered to an amplifier 52 which, through slip rings 54, is used to control the energization of a magnetic clutch 56. The amplified output from unit 52 constitutes a signal representing the mean spark gap voltage occurring between the electrode 32 and the workpiece 34. Detector 50 may also be the source of control signals for the servo motor 40 to which it is therefore shown connected by a circuit 51. If the mean spark gap voltage tends to increase, as upon failure of the servo motor 40 to respond sufficiently rapidly to its control signals as the spark gap increases beyond its predetermined length with progressive erosion of the workpiece 34, there will be a resultant change of energization of the magnetic clutch 56 (e.g. in a lag-decreasing sense) sufficient to shift the phase of generator 2 in relation to that of generator 1 so as to convert the mode of operation of the two generators more nearly to the condition depicted in FIG. 3B'. When the spark gap is again reduced by the servo motor 40, so that the mean voltage drops, the rate of energization of the magnetic clutch 56 is again changed (e.g. in a lag-increasing sense) with resulting slippage to produce a reverse phase shift between the generators so as to restore more nearly the condition depicted in FIG. 3C'. There is thus provided in the apparatus of FIG. 7 a means for automatically compensating for changes in spark-gap clearance by adjustively compensating the applied voltage through the medium of automatic phase shift of one generator relative to the other. This apparatus may be provided with other auxiliary features such as those depicted in FIG. 1 in order to accomplish still further functions as previously described.

In FIG. 8 I have shown a system which uses a single generator 60 to accomplish substantially the same result as the two-generator system of FIG. 7. Generator 60 has a pair of field coils 61, 62, energized by a D.-C. source 63 in series with an adjustable control resistor 64 and an armature driven by a prime mover 65, the armature including a winding 66 connected across an impedance 67. The field circuit of generator 60 is inductively connected to the energizing circuit of machining electrode 32 and workpiece 34 via an adjustable coupling in the form of a saturable reactor 68 having a biasing winding 69 which is energized from a current source 70 by way of an adjustable impedance here shown as an amplifier 71. This amplifier is controlled via connection 72 by the gap-length detector 50 which also controls the resistor 64 through a link 73 and the servo motor 40 by way of a transmission line 51 as described in conjunction with FIG. 7.

In operation, any increase in the input voltage to detector 50 (as measured across leads 28 and 30) results in a corrective signal to servo motor 40 and an adjustment of resistor 64 and amplifier 71, the former reducing the impedance in the field circuit of generator 60 so as to slow down the rotation of its armature whereas the latter decreases the biasing current of reactor 68; both measures together increase the intensity of the discharge current. The opposite effect occurs when the gap is reduced below its normal length, e.g. by overcorrection of the servo motor. Thus, the average magnitude of the discharge current integrated over an extended period, can be maintained substantially constant for an even surfacing of the machined workpiece.

My invention is, of course, not limited to the specific embodiments described and illustrated since numerous modifications, readily apparent to persons skilled in the art, may be made therein and are intended to be embraced within the spirit and scope of the appended claims.

I claim:
1. In electric spark-discharge-machining apparatus including an electrode separated by a gap from a workpiece to be machined thereby, in combination: power-source means comprising two electric impulse generators each operable for periodically producing gap-ionizing electric impulses of only one polarity and of a width less than one-half of the period and means connected therewith for driving said generators in predetermined phase relationship of their respective output impulses and for driving one of said generators at an impulse frequency equaling an integral number of times the frequency of the other generator and electric circuit means for electrically interconnecting the electrode and workpiece with said generators for applying the combined outputs thereof to said gap, said power-source means further comprising machining-control means operable to vary the phase relationship of said generators between a substantially coincident relationship of at least certain of their respective pulses to a relatively phase-displaced relationship therebetween of such degree as to avoid time overlay of impulses from different generators whereby electric impulses can be applied across the gap ranging from relatively high gap-ionizing amplitude and low frequency to relatively low gap-ionizing amplitude and high frequency.

2. The combination defined in claim 1 wherein said electric circuit means includes switch means operatively connected to said generators for reversing the polarity of one impulse generator relative to that of the other.

References Cited
UNITED STATES PATENTS
3,213,258   10/1965   Ferguson _____ 219—69

RICHARD M. WOOD, *Primary Examiner.*

R. F. STAUBLY, *Assistant Examiner.*